US012755052B2

(12) United States Patent
Tanski et al.

(10) Patent No.: US 12,755,052 B2
(45) Date of Patent: Oct. 6, 2026

(54) REVERSIBLE SECRET KEY ENCRYPTION OF NODE PARAMETERS IN NEURAL NETWORKS

(71) Applicant: Capital One Services, LLC, McLean, VA (US)

(72) Inventors: Peter Tanski, Marlborough, MA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/057,065

(22) Filed: Feb. 19, 2025

(65) Prior Publication Data

US 2026/0244784 A1 Aug. 20, 2026

(51) Int. Cl.
*G06F 21/62* (2013.01)
*G06N 3/048* (2023.01)
*H04L 9/30* (2006.01)

(52) U.S. Cl.
CPC ......... *G06F 21/6245* (2013.01); *G06N 3/048* (2023.01); *H04L 9/3066* (2013.01)

(58) Field of Classification Search
CPC .... G06F 21/6245; G06N 3/048; H04L 9/3066
See application file for complete search history.

(56) References Cited

U.S. PATENT DOCUMENTS 12,287,856 B2 * 4/2025 Osborn ................... G06F 21/31
2019/0244082 A1 * 8/2019 Franca-Neto .......... G06N 3/063
2021/0150037 A1 5/2021 Radhakrishnan et al.
2022/0300639 A1 * 9/2022 Bellman, Jr. ........ G06F 21/6245
2024/0259180 A1 * 8/2024 Joye ........................ H04L 9/008
2025/0030536 A1 * 1/2025 Soriente .................. G06F 7/544

FOREIGN PATENT DOCUMENTS

CN 114186251 B * 6/2025 ........... H04L 9/3066

OTHER PUBLICATIONS

Mar. 31, 2023—A Closer Look at Parameter-Efficient Tuning in Diffusion Models; Xiang et al. (14 pages).
Stochastic gradient descent—Wikipedia—accessed Feb. 19, 2025 (17 pages).

(Continued)

*Primary Examiner* — Sarah Su
(74) *Attorney, Agent, or Firm* — Banner & Witcoff, Ltd.

(57) ABSTRACT

Aspects of the disclosure may comprise a method for encrypting parameters of nodes (e.g. neurons) within an artificial neural network such that private and/or confidential information may be used for training and/or embedded within the artificial neural network with minimal risk of exposure. Aspects of the disclosure further comprise encrypting the node parameters such that the artificial neural network may be trained on the encrypted node parameters and, at runtime, decrypted such that output values reflect the unencrypted node parameters. Aspects of the disclosure may further comprise encrypting the artificial neural network after training has already taken place with unencrypted values to protect private and/or confidential data that may have already been used to train the artificial neural network.

20 Claims, 7 Drawing Sheets

(56) References Cited

OTHER PUBLICATIONS

Privacy-Secure Stochastic Gradient Descent; R. Bixler—accessed Feb. 19, 2025 (4 pages).
Dec. 17, 2018—Stochastic gradient descent with differentially private updates; S. Song et al. (4 pages).
Privacy-preservation for Stochastic Gradient Descent Application to Secure Logistic Regression; Wu et al.—accessed Feb. 19, 2025 (4 pages).
Dec. 17, 2018—Privacy-Preserving Distributed Learning via Obfuscated Stochastic Gradients; Gade et al. (8 pages).
Apr. 12, 2023—A Closer Look at Parameter-Efficient Tuning in Diffusion Models v2; Xiang et al. (14 pages).
Jun. 2, 2024—Journey LLM 8: Activation Functions; A. Jain (32 pages).
Oct. 23, 2023—LLMOps 101: Metrics & Evaluation—Part 1; A. McMahon (11 pages).
May 4, 2023—Top Performance Metrics in Machine Learning: A Comprehensive Guide; D. Shah (31 pages).
Elliptic-curve cryptography—Wikipedia—accessed Feb. 19, 2025 (12 pages).
Homomorphic encryption—Wikipedia—accessed Feb. 19, 2025 (12 pages).
Activation function—Wikipedia—accessed Feb. 19, 2025 (6 pages).
Security Notes for Homomorphic Encryption—OpenFHE (https://openfhe-development.readthedocs.io/en/latest/sphinx_rsts/intro/security.html; accessed Feb. 19, 2025) (2 pages).
HEAAN (Homomorphic Encryption for Arithmetic of Approximate Numbers)—Wikipedia—accessed Feb. 19, 2025 (4 pages).
Jul. 18, 2023—HElib GitHub repository (https://github.com/homenc/HElib; accessed Feb. 19, 2025) (2 pages).
Microsoft SEAL GitHub repository (https://github.com/microsoft/SEAL; accessed Feb. 19, 2025) (13 pages).
May 28, 2021—PALISADE Lattice Cryptography Library GitLab Library (hhttps://gitlab.com/palisade/palisade-release/-/blob/master/README.md?ref_type=heads; accessed Feb. 19, 2025) (3 pages).

* cited by examiner

REVERSIBLE SECRET KEY ENCRYPTION OF NODE PARAMETERS IN NEURAL NETWORKS

CROSS-REFERENCE TO RELATED APPLICATIONS

This application is related to co-pending application U.S. Ser. No. 19/057,095, filed Feb. 19, 2025, entitled "Reversible Secret Key Encryption of Node Parameters in Neural Networks" and filed concurrently herewith, the entirety of which is incorporated by reference for all purposes.

TECHNICAL FIELD

Aspects described herein generally relate to improving security and privacy when training neural networks while preserving accuracy of the model. More specifically, aspects provide for introducing a secret key and secret function into one or more parameters associated with nodes in a neural network, such that outputs from the neural network are perturbed if the model is run without a corresponding key and corresponding function to decrypt the neural network at run time.

BACKGROUND OF THE INVENTION

Neural networks, e.g. artificial neural networks or deep learning networks, are a type of machine learning model comprising one or more layers of interconnected nodes (sometimes referred to as "neurons"). Neural networks may be classified as a type of artificial intelligence ("AI"). Neural networks may be used across many industries, including robotics, data mining, medical diagnoses, generative AI, natural language processing ("NLP"), facial recognition, and/or others. To build an effective neural network requires the use of many training samples, often numbering into the millions or billions.

Obtaining training data for a neural network may have risks. Depending on the goal of the neural network, training data may comprise data that has statutory protections, such as the Health Care Portability Accountability Act ("HIPAA"), Fair Credit Reporting Act ("FCRA"), Gramm-Leach-Bliley Act ("GLBA"), General Data Protection Regulation ("GDPR"), and/or others. Training data may also comprise sensitive and private information about individuals that an organization wishes to protect. Additionally or alternatively, training data may comprise confidential data collected by an organization that may advantage an organization's competitors if accessed by a third party. For these reasons, organizations have a vested interested in protecting training data.

Organizations frequently apply multiple security measures to private and/or confidential data, including data encryption. Data encryption may add important security measures because, in the event of a data breach, a breaching entity without the proper security keys may find it impractical (e.g., excessively time-consuming) to decrypt data to obtain the original values. In turn, this may heavily limit the exposure of private and/or confidential data and may minimize the organization's risks regarding such data.

Machine learning models trained on encrypted data may not be able to process "original," un-encrypted values properly, which may reduce their effectiveness in the real world. On the other hand, machine learning models trained on unencrypted data may "expose" private and/or confidential data with the right inputs, prompts, and/or queries. As a result, organizations need to be able to implement encryption techniques such that models may still be trained to receive real-world data while maintaining security over any private and/or confidential data used in training.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the limitations described above, and to overcome other limitations that will be apparent upon reading and understanding the present specification, aspects described herein are directed to a computer-implemented method, comprising: seeding a first plurality of nodes in an artificial neural network comprising a plurality of layers each comprising one or more nodes, wherein a node is associated with one or more weights and wherein the one or more weights are randomly generated and where the node is associated with one or more activation functions, wherein an activation function connects the node to a node in a sequential layer and is a formula to calculate an intermediary output value based on one or more input values and one or more weights. The method further comprises training, based on the first plurality of nodes, the artificial neural network, wherein training comprises one or more iterations of: determining a loss function for one or more of the first plurality of nodes, and adjusting one or more weights associated with one or more nodes based on the loss function. The method further comprises encrypting, using a first key and a first function, one or more nodes in the first plurality of nodes, wherein encrypting a node comprises modifying an activation function associated with the node causes the intermediary output value to be further based on the first key and the first function and then training, based on the first plurality of nodes, the artificial neural network, until the artificial neural network satisfies an performance threshold for a type of input value. The method then further comprises receiving one or more input values to the artificial neural network. The method then further comprises decrypting, at each layer in the artificial neural network and based on a second key and a second function, one or more nodes, wherein decrypting a node comprises modifying the activation function of the node to neutralize the encryption of the first key and the first function, and determining, based on the one or more input values and one or more decrypted activation functions, one or more intermediary output values, and sending the one or more intermediary output values to a sequential layer in the artificial neural network, wherein the one or more intermediary output values are received as one or more input values at the sequential layer. The method then further comprises causing output of, from the artificial neural network, an output value, wherein the output value is based on one or more decrypted nodes.

The first function of the method may further comprise seeding a second plurality of nodes, wherein the second plurality of nodes is associated with confidential information, encrypting, based on a third key and the first function, the second plurality of nodes, wherein the third key is calculated based on the first key and a cryptographic function, embedding the second plurality of nodes as one or more layers within the artificial neural network; and training the artificial neural network. The first key of the method may be a private key and the second key may be a public key calculated based on the first key. The second key may be calculated using elliptic curve cryptography (ECC).

The method may further comprise encrypting the first plurality of nodes by, for one or more layers in the artificial neural network, calculating, based on the first key and a third function, a third key and encrypting one or more nodes in the layer based on the first function and the third key. The method may further comprise encrypting a layer with a key that is unique within the artificial neural network. The first plurality of nodes may comprise confidential information.

A second aspect herein may provide that a computing device, comprising one or more processors and memory storing instructions that, when executed by the one or more processors, cause the computing device to: seed a first plurality of nodes in an artificial neural network comprising a plurality of layers each comprising one or more nodes, wherein a given node is associated with an activation function and one or more weights. The instructions may further cause the computing device to train the first plurality of nodes comprising the artificial neural network, wherein training comprises one or more iterations of determining a loss function for one or more of the first plurality of nodes, and adjusting one or more weights associated with one or more nodes based on the loss function. The instructions may further cause the computing device to encrypt, using a first key and a first function, one or more nodes in the first plurality of nodes, wherein encrypting a node comprises modifying an activation function associated with the node to calculate an intermediary output value further based on the first key and the first function and train, based on the first plurality of nodes, the artificial neural network, until the artificial neural network satisfies an performance threshold for a type of input value. The instructions may further cause the computing device to receive one or more input values to the artificial neural network. The instructions may further cause the computing device to, at each layer in the artificial neural network, decrypt, based on a second key and a second function, one or more nodes, wherein decrypting a node comprises modifying an activation function associated with the node to neutralize the encryption of the first key and the first function; determine, based on the one or more input values and one or more decrypted activation functions, one or more intermediary output values; and send the one or more intermediary output values to a sequential layer in the artificial neural network, wherein the one or more intermediary output values are received as one or more input values at the sequential layer. The instructions may further cause the computing device to cause output of, from the artificial neural network, an output value, wherein the output value is based on one or more decrypted nodes.

The second aspect may also provide that the first function further comprises seeding a second plurality of nodes, wherein the second plurality of nodes is associated with confidential information; encrypting, based on a third key and the first function, the second plurality of nodes, wherein the third key is calculated based on the first key and a cryptographic function; embedding the second plurality of nodes as one or more layers within the artificial neural network; and training the artificial neural network. The second aspect may further comprise where the first key is a private key and the second key is a public key calculated based on the first key. The second key may be calculated using elliptic curve cryptography (ECC).

The second aspect may also provide that encrypting the first plurality of nodes further comprises: for one or more layers in the artificial neural network, calculating, based on the first key and a third function, a third key; and encrypting one or more nodes in the layer based on the first function and the third key. A layer is encrypted with a key that is unique within the artificial neural network. The first plurality of nodes comprises confidential information.

A third aspect described herein provides for one or more non-transitory computer-readable media storing instructions that, when executed by one or more processors, cause a computing device to perform steps comprising: seeding a first plurality of nodes in an artificial neural network, comprising a plurality of layers each comprising one or more nodes, wherein a node is associated with an activation function and one or more weights. The instructions may further cause the computing device to perform steps comprising training the first plurality of nodes comprising the artificial neural network, encrypting, using a first key and a first function, one or more nodes in the first plurality of nodes, wherein encrypting a node comprises modifying, based on the first key and the first function, at least one of: one or more weights associated with the node, or an activation associated with the node. The instructions may further cause the computing device to perform steps comprising training, based on the first plurality of nodes, the artificial neural network, until the artificial neural network satisfies a performance threshold for a type of input value. The instructions may further cause the computing device to perform steps comprising receiving one or more input values to the artificial neural network. The instructions may further cause the computing device to perform steps comprising, at each layer in the artificial neural network, decrypting, based on a second key and a second function, one or more nodes, wherein decrypting a node comprises neutralizing the encryption of the first key and the first function, determining, based on the one or more input values and the decrypted node, one or more intermediary output values, and sending the one or more intermediary output values to a sequential layer in the artificial neural network, wherein the one or more intermediary output values are received as one or more input values at the sequential layer. The instructions may further cause the computing device to perform steps comprising causing output of, from the artificial neural network, an output value, wherein the output value is based on one or more decrypted nodes.

The third aspect may also provide for instructions that, when executed by one or more processors, further cause the computing device to perform steps comprising seeding a second plurality of nodes, wherein the second plurality of nodes comprises confidential information, encrypting, based on a third key and the first function, the second plurality of nodes, wherein the third key is calculated based on the first key and a cryptographic function, embedding the second plurality of nodes as one or more layers within the artificial neural network; and training the artificial neural network. The first key may be a private key and the second key may be a public key calculated based on the first key. The second key may be calculated using elliptic curve cryptography (ECC).

The third aspect may also provide for instructions that, when executed by one or more processors, further cause the computing device to perform steps comprising: for one or more layers in the artificial neural network, calculating, based on the first key and a third function, a third key, and encrypting one or more nodes in the layer based on the first function and the third key. A layer may be encrypted with a key that is unique within the artificial neural network.

Corresponding methods, apparatus, systems, and non-transitory computer-readable media are also within the scope of the disclosure.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
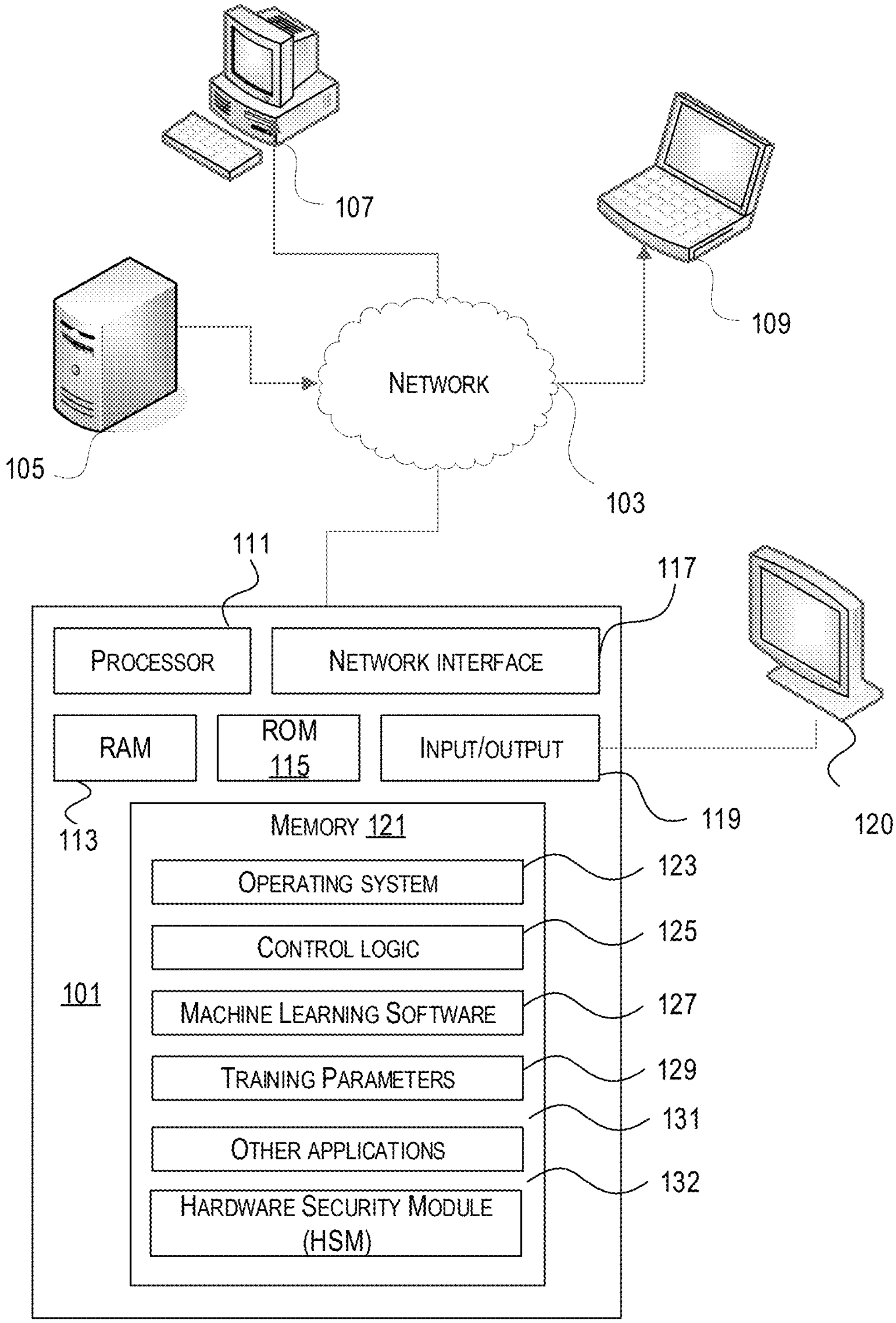
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

By way of introduction, the following description addresses problems related to the training and storage of neural networks comprising private and/or confidential information. Organizations with such information may face legal and/or business requirements to keep such information secure and protected. Organizations may also wish to train machine learning models, such as neural networks, on such information. Therefore, organizations need a way to encrypt neural networks such that node parameters within the neural network, which may comprise private and/or confidential information, are protected while still being able to train the neural network. Organizations may also be able to decrypt the neural network at runtime to obtain accurate outputs. At the same time, organizations need to be able to prevent unauthorized third parties from being able to decrypt the neural network, which prevents unauthorized third parties from being able to access private and/or confidential information.

Described herein is a method for securely training and storing neural networks (e.g., machine learning models) with private and/or confidential information by encrypting node parameters in the neural network. The encrypted nodes may then be trained with private and/or confidential information (e.g., financial information, patient data, etc.). Because the model is encrypted, any outputs from the model will be gibberish and very difficult to trace back to the original private and/or confidential information. Unauthorized third parties (e.g., hackers) may find it unreasonably time-consuming to attempt to decrypt the outputs, which in turn prevents private and/or confidential information from being exposed. At the same time, an authorized party may be given a decryption key. The decryption key may be used to decrypt each node in the model as the model is being queried, resulting in a non-encrypted output. The encryption system therefore protects confidential and/or private information from unauthorized actors while allowing the information to be used by authorized parties for other business goals.

Aspects herein improve the functioning of a computer by improving the security of private and/or confidential information during training and storage of machine learning models (e.g., neural networks) on computers. Aspects further improve security of private and/or confidential information when parties query the neural network by allowing access to the decrypted model to be limited to only authorized parties.

FIG. 1 illustrates one example of a network architecture and data processing devices that may be used to implement one or more illustrative aspects described herein. Various network nodes 101, 105, 107, and 109 may be interconnected via a wide area network (WAN) 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 105, and client computers 107, 109. Data server 105 provides overall access, control and administration of databases and control software for performing one or more illustrative aspects described herein. Data server 105 may be connected to a second server through which users interact with and obtain data as requested. Alternatively, data server 105 may act or include the functionality of the second server itself and be directly connected to the Internet. Data server 105 may be connected to the second server through the network 103 (e.g., the Internet), via direct or indirect connection, or via some other network. Users may interact with the data server 105 using remote computers 107, 109, e.g., using a web browser to connect to the data server 105 via one or more externally exposed web sites hosted by data server 105. Client computers 107, 109 may be used in concert with data server 105 to access data stored therein, or may be used for other purposes. For example, from client device 107 a user may access the second server using an Internet browser, as is known in the art, or by executing a software application that communicates with data server 105 and/or the second server over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 101 may be combined on a single server.

Each component 101, 105, 107, 109 may be any type of known computer, server, or data processing device, e.g., laptops, desktops, tablets, smartphones, servers, micro-PCs, etc. Data server 101, e.g., may include a processor 111 controlling overall operation of the data server 101. Data server 101 may further include RAM 113, ROM 115, network interface 117, input/output interfaces 119 (e.g., keyboard, mouse, display 120, printer, etc.), and memory 121. I/O 119 may include a variety of interface units and drives for reading, writing, displaying, and/or printing data or files. Memory 121 may further store operating system software 123 for controlling overall operation of the data processing device 101, control logic 125 for instructing data server 101 to perform aspects described herein, machine learning software 127, training parameters 129, and other application software 131 providing secondary, support, and/or other functionality which may or may not be used in conjunction with other aspects described herein. The control logic may also be referred to herein as the data server software 125. Memory 121 may further comprise hardware security module (HSM) 132 for handling security and authentication for data processing device 101. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including one or more databases. Information can be stored in a single database, or separated into different logical, virtual, or physical databases, depending on system design. Devices 105, 107, 109 may have similar or different architecture as described with respect to device 101. Those of skill in the art will appreciate that the functionality of data processing device 101 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
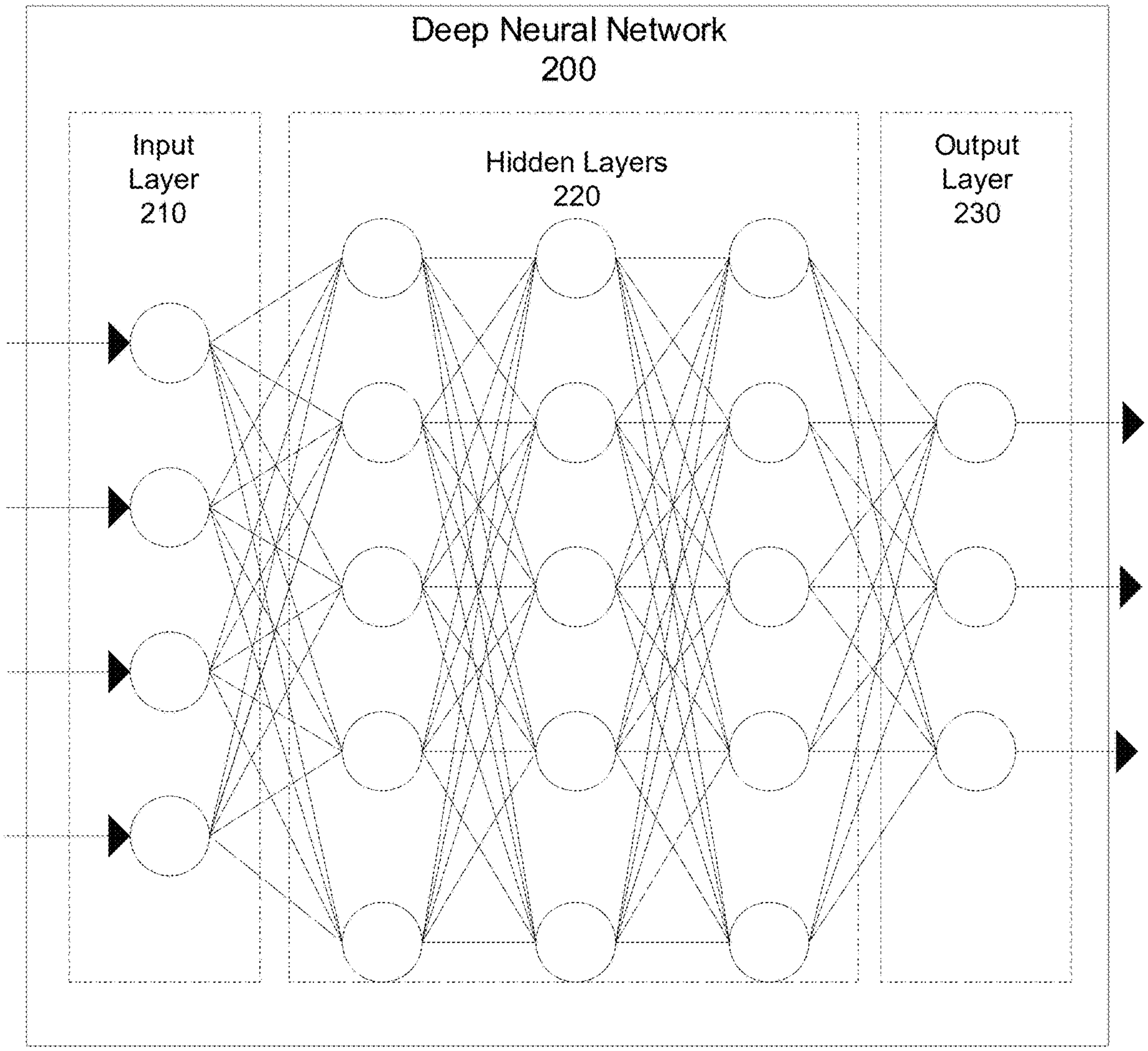
FIG. 2 depicts an example of a neural network architecture for a model according to one or more aspects of the disclosure.

FIG. 2 depicts an example of artificial neural network architecture for a large language model in accordance with one or more illustrative aspects described herein. Artificial neural network 200 may be all or portions of a machine learning software, which may run on computing device 101, 105, 107, 109 as shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive one or more input values and generate one or more node output values. A node output value in the artificial neural network may be calculated based on an activation function, inputs to the node, and the weights associated with the node. A node output value may be further based on one or more intermediary calculations. An activation function may be a function which receives one input parameter and outputs one prediction value. The input parameter may be an intermediary note output value based on the one or more intermediary calculations. The activation function may represent a "connection" from a node in one layer to a node in a sequential layer. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

Artificial neural network 200 may have an input layer 210, one or more hidden layers 220, and an output layer 230. A deep neural network, as used herein, may be an artificial neural network that has more than one hidden layer. Artificial neural network 200 is depicted with three hidden layers, and thus may be considered a deep neural network. The number of hidden layers employed in artificial neural network 200 may vary based on the particular application and/or problem domain. For example, a network model used for image recognition may have a different number of hidden layers than a network used for speech recognition. Similarly, the number of input and/or output nodes may vary based on the application. Many types of artificial neural networks are used in practice, such as convolutional neural networks, recurrent neural networks, feed forward neural networks, combinations thereof, and others.

During the model training process, the weights and/or biases of each connection and/or node may be adjusted in a learning process as the model adapts to generate more accurate predictions on a training set. The weights and/or biases assigned to each connection and/or node may be referred to as the node parameters. The model may be initialized with a random or white noise set of initial model parameters (e.g., seeding the model). The model parameters may then be iteratively adjusted using, for example, stochastic gradient descent algorithms that seek to minimize errors in the model.

An artificial neural network may be hosted on a computing device similar to 101 and 105. An artificial neural network may receive prompts from computing devices 103, 105, 107, 109 over network 103 and may return output over network 103 to computing device 101, 105, 107, 109. Computing devices 101, 105 may also receive Application Programming Interface (API) requests over network 103 from computing devices 107, 109, where the API request may comprise inputs (e.g., prompt and/or query) for an artificial neural network.

Figure 3:
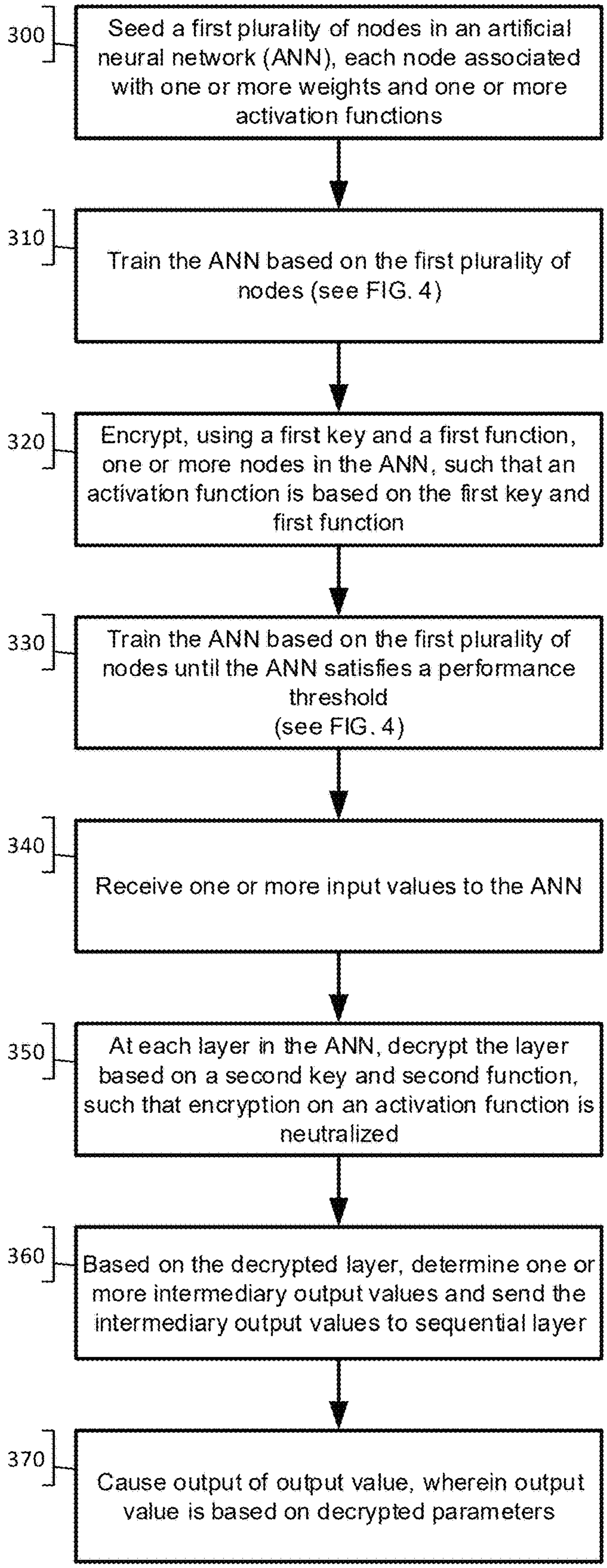
FIG. 3 depicts a flowchart for seeding a plurality of nodes for a neural network and training the neural network in accordance with one or more illustrative aspects.

FIG. 3 depicts a flowchart for seeding a first plurality of nodes for a neural network and training the neural network in accordance with one or more illustrative aspects. FIG. 3 is an example of a workflow for training an artificial neural network by applying one or more machine learning techniques, encrypting one or more nodes in the artificial neural network such that an activation function for a node is based on a first key and a first function, and training the artificial neural network until the artificial neural network satisfies a performance threshold. After being trained, the artificial neural network may receive one or more input values, decrypt one or more nodes in the artificial neural network, determine one or more node output values based on the one or more decrypted nodes and the one or more input values, and cause output of an output value that is based on the one or more decrypted nodes.

In Step 300, a computing device may seed a first plurality of nodes for the artificial neural network. The computing device may be any one or more of computing devices 101, 105, 107, and/or 109 as depicted in FIG. 1. The seeded first plurality of nodes may be similar to artificial neural network 200 in FIG. 2. A node in the first plurality of nodes may be associated with one or more node parameters, which may comprise: one or more weights and/or biases, one or more activation functions, one or more base values, and/or additional aspects. The one or more weights may be generated randomly. The one or more biases may be defaulted to 0. A weight may modify a magnitude of a given input: for example, in the equation $y=2x$, the weight would be 2. A bias may be an additive property: for example, in the equation $y=x+4$, the bias would be 4. For the purposes of this disclosure, "weight" may include weight and/or bias.

An activation function may be a function outputting an output value based on one or more input values and associated weights. An activation function may be represented as $f(x)$, where x represents a combination of one or more input values to a node and a transformation, wherein a transformation may represent one or more intermediary functions combining one or more weights associated with the node and one or more biases associated with the node. Each connection between a node and one or more nodes in a sequential layer may be represented by a given activation function and may have weights associated with the given activation function. Additionally or alternatively, weights may be associated with the node and used in one or more activation functions. The output value may be sent to one or more nodes in a sequential layer, where the output value may be received as an input value in a receiving node.

Node activation may be based on a suitable activation function formula. Different layers within an artificial neural network may have different activation functions. Exemplary activation functions may include, but are not limited to: sigmoid/logistic regression, Tanh, Rectified Linear Unit (ReLU), Leaky ReLU, Parametric ReLU, Exponential Linear Units (ELU), Swish, Gaussian Error Linear Unit (GELU), Scaled Exponential Linear Unit (SeLU), Sigmoid Linear Unit (SiLU, also known as "Swish") and/or others. Selection of an activation function formula may be based on one or more factors, such as: architecture of the artificial neural network, goals of the artificial neural network, whether a layer comprising the associated node is hidden, to improve computational efficiency, speed, re-training, current state of the art, and/or other factors.

For example, an activation function associated with a node in an outer layer, similar to layer 230 in FIG. 2, may be based on a sigmoid/logistic or a Tanh function because those functions are highly normalizing. By contrast, an activation function associated with a node in a hidden layer may not be based on a sigmoid/logistic or a Tanh function because the highly normalizing effect reduces range of values and may make training more time-consuming and process-intensive.

Additionally or alternatively, an activation function may be selected based on architecture of the artificial neural network. For example, many LLMs may use GELU as an activation function because GELU provides smoother outputs in transformer architectures, which are used in many LLMs. Additionally or alternatively, an activation function may be selected based on the goal of the artificial neural network. For example, SiLU may be used for image generation models built on transformer architectures because SiLU is optimized for image generation.

Additionally or alternatively, an activation function may be selected based on an effect of encryption on the activation function output. Encryption keys and encryption methods may affect output of the activation function. An encryption method may be selected based on the encryption method resulting in outputs in bounded or constrained numerical ranges: for example, only returning outputs above zero, returning outputs within range of a predefined value, etc. Restricting the range of outputs of an encryption function may make training an artificial neural network easier by keeping the outputs within range of the activation function. Encryption methods that significantly change an output of an activation function (e.g., an output below zero) may not be preferred with a ReLU activation function because ReLU, which zeroes (e.g., flattens) out any output below a set value, may zero out too many nodes for the artificial neural network to be trained properly on encrypted layers. Incorporating encryption keys and encryption methods will be described further with respect to step 320.

The artificial neural network may be seeded with one or more layers. A layer may comprise one or more nodes, wherein each node comprises one or more weights and/or one or more activation functions. The artificial neural network may have an input layer, one or more hidden layers, and/or an output layer, similar to the artificial neural network depicted in FIG. 2. Although FIG. 2 depicts three hidden layers, any number of hidden layers may be possible. Fewer layers may be desirable for less complex tasks because the artificial neural network may be able to process one or more input values more quickly. More layers may be desirable for more complex tasks, such as natural language output or other tasks where more variety and accuracy are desired, because more layers provide for precision over a wider range in output.

Additionally or alternatively, the first plurality of nodes may further comprise one or more base values, such as one or more values from a plurality of training parameters. The plurality of training parameters may correspond with the type of input values that the artificial neural network is intended to analyze and/or the type of output values that the artificial neural network is intended to output. For example, to train a neural network to identify dogs in images, the training parameters may comprise images where some of the images contain dogs and some do not. For a large language model (LLM), the training parameters may be a variety of prose documents and/or prose-based websites to train the LLM to output prose. A base value may be associated with real-world data. A base value may be confidential or personally-identifiable data (PII) and an organization may have a commercial or legal duty to keep the base value private and secure.

In Step 310, the computing device may train the artificial neural network based on the first plurality of nodes. Training the artificial neural network may employ one or more training techniques, such as, but not limited to: supervised learning, unsupervised learning, back propagation, Adam stochastic optimization, stochastic gradient descent (SGD), learning rate decay, dropout, max pooling, long shot-term memory, skip-gram, and/or other equivalent deep learning techniques. The artificial neural network may be trained used self-supervised learning (e.g., contrastive learning) to decouple the embedding spaces of the negative and positive examples. In the examples depicted in FIGS. 3 and 4, the artificial neural network may be trained using SGD, and steps may be described with the context of SGD. However, the method may also be applied to other training techniques. Training steps may be discussed in more depth with respect to FIG. 4.

In Step 320, the computing device may encrypt one or more nodes in the first plurality of nodes using a first key and a first function such that output of an activation function (e.g., node output value) associated with a node is further based on the first key and the first function. Additionally or alternatively, all of the nodes in the first plurality of nodes may be encrypted.

Encryption may refer to a process of encoding values such that it may be prohibitively difficult or time-consuming to determine an original value based on an associated encoded value without an associated encryption key, secret, and/or otherwise knowing the encryption function. Encrypted values may have little or no resemblance to original values. Encryption often comprises an encryption function and a randomly generated encryption key, wherein an encrypted value is calculated based on the encryption function, original value, and encryption key. However, many standard encryption methods output encrypted values that cannot be used for operations without decrypting the values.

The first key may be a string of numbers and/or letters used with the first function. The first key may be used with the first function (as further described in the next paragraph) to encrypt values such that it may be computationally very difficult (e.g., unreasonably time consuming) to determine an unencrypted value based solely on a corresponding encrypted value. Additionally or alternatively, the first key may be a base for generating one or more additional keys such that the additional keys may be able to decrypt values that have been encrypted with the first key. Any suitable method for generating additional keys may be used, including, for example, Diffie-Hellman key exchange, RSA key exchange, elliptic-curve cryptography (ECC), and/or others. ECC may be preferred because ECC encryption allows for smaller keys, which may allow for encryption and decryption to be performed more quickly.

The first function may be a homomorphic encryption function. Homomorphic encryption refers to encryption methods wherein encrypted values may be operated on without decrypting the values. A homomorphic function is a function wherein values within a set, when the function is applied to all values within the set, maintain at least one mathematical relationship across all the output values. Homomorphic encryption may be used to calculate encrypted values for a plurality of values, then perform further analysis on the encrypted values without decrypting the values first. Because homomorphic encryption allows for analysis of encrypted values, homomorphic encryption may allow for analysis of confidential data or PII without exposing data. In an artificial neural network, weights alone may represent confidential data or PII because a third party may be able to apply the trained weights to a different artificial neural network and achieve outputs similar to training parameters. Homomorphically encrypting weights may address the scenario where weights are accessed by an unauthorized third party; without knowing a key and/or function to reverse the encryption (e.g. decrypt), outputs based on the weights may not resemble training parameters nor be applicable for real world use.

Figure 4:
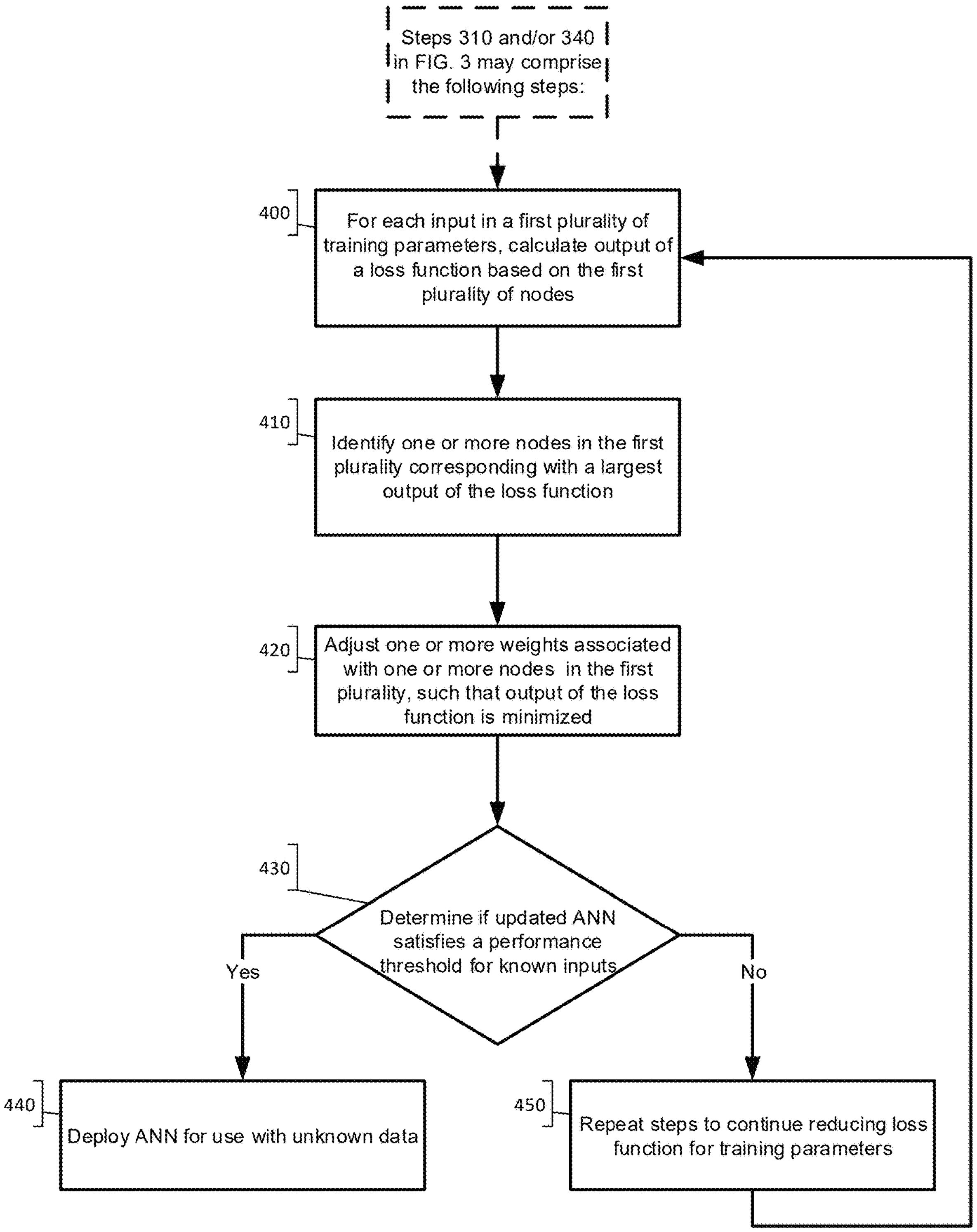
FIG. 4 depicts a flowchart for training a neural network by adjusting one or more weights in the plurality of nodes in accordance with one or more illustrative aspects.

Encrypted nodes in the artificial neural network may be trained using standard techniques, as discussed in step 310 and in FIG. 4. However, encrypted nodes may output values, and further cause the artificial neural network to output values, which do not have meaning unless decrypted with an appropriate decryption key and/or decryption function. Encrypting one or more nodes in this way may allow the artificial neural network to be seeded and/or trained with confidential data and the model deployed to the public without risking exposure of confidential data.

Encrypting a node may comprise encrypting one or more node parameters and/or incorporating an encryption step into the one or more intermediary calculations associated with the node. For example, encryption may comprise encrypting (e.g., modifying) one or more weights associated with a node with the first key and the first function. Encryption of the one or more weights may be preferred because the first key and first function may be simpler (e.g., less computationally complex) while still achieving the security benefits of encryption. The one or more weights may be stored as encrypted weights. Additionally or alternatively, the one or more weights may be stored "unencrypted," or in plaintext. Because the weights may not provide accurate outputs without a second key and a second function corresponding to the first key and first function, the weights may be stored in plaintext while still reducing security risks.

According to an aspect, encryption of one or more weights associated with a node may comprise incorporating the first key and the first function into an intermediary calculation based on one or more weights and one or more input values. For example, where an unencrypted intermediary calculation based on a single input value and single weight may be represented as "input value*weight" for a given node, an encrypted calculation may be represented as "input value*weight*first key," wherein the first function "multiply by x" and x is the first key.

According to another aspect, a weight may be adjusted based on the first key and the first function during training. For example, if a loss function associated with a weight found a loss of "x", an adjustment without encryption may be represented as "weight+x." An adjustment with encryption may be represented as "(weight+x+first key)" wherein the first function is "add x" and x is the first key. Incorporating the first key and the first function into an intermediary calculation may improve security because the weights will not provide accurate outputs without a second key and a second function corresponding to the first key and first function.

Additionally or alternatively, encryption may comprise incorporating the first key and the first function into one or more intermediary calculations such that input to an activation function is further based on the first key and the first function. Encryption by incorporating the first key and first function into the one or more intermediary calculations may be more difficult because an intermediary output of the first key and first function may maintain a mathematical relationship with an intermediary output without the first key and first function. Additionally or alternatively, one or more base values associated with a node may be encrypted with the first key and the first function, for example, when the node also comprises one or more base values.

One or more layers, comprising one or more nodes, may be encrypted with the first key and the first function. Additionally or alternatively, a first layer in the artificial neural network may be encrypted with a first key and first function, a second layer with a second key and second function, an n-th layer with an n-th key and n-th function, and so forth. An example of an artificial neural network wherein layers may be individually encrypted may be discussed further with respect to FIG. 5

In step 330, the computing device may further train the artificial neural network is based on the encrypted first plurality of nodes until the artificial neural network satisfies a performance threshold. Performance thresholds may include, but are not limited to: precision, recall, accuracy, speed, and/or more. A performance threshold may be selected based on, but not limited to: the type of model, the type of inputs, the type of expected outputs (e.g., the use case for the model), importance of a false positive versus a false negative, and/or others. The artificial neural network may be measured against one or more performance thresholds to determine whether the artificial neural network is ready for use with real world data. Selection and calibration of performance thresholds for the artificial neural network will be discussed further with respect to FIG. 4. Additionally or alternatively, the artificial neural network may satisfy one or more performance thresholds before the encryption of step 320, then trained again under step 340 until the artificial neural network again satisfies one or more performance thresholds with the encrypted first plurality of nodes. This may allow a previously-satisfactory artificial neural network to be encrypted to gain additional security benefits while minimizing an amount of training necessary, e.g., without being required to re-train the artificial neural network from the beginning, reducing time and resource expenditures.

When the artificial neural network satisfies one or more thresholds, the artificial neural network may be deployed for use with real world data. The artificial neural network may be hosted on a server similar to server 105, as depicted in FIG. 1, and accessed over a network similar to network 103.

In Step 340, the artificial neural network may receive one or more input values. Users may access the artificial neural network by sending a request (e.g., prompt, query) comprising one or more input values from a user-operated computing device, similar to computing device 101, 107, and/or 109, over network 103 to the artificial neural network hosted on server 105. The one or more input values may be received by the artificial neural network in an input layer similar to input layer 210 depicted in FIG. 2 and/or FIG. 5. The one or more input values may be a prompt, a statement in prose, search terms, numerical data, and/or other data formats. The one or more input values may also be referred to as a query. Users may further receive output from the artificial neural network over network 103 on the user-operated computing device.

The artificial neural network may be deployed for internal use, e.g., for use within the organization. Additionally or alternatively, access to the artificial neural network may be extended to one or more third parties. Access by a third party may be controlled by distributing a second key (e.g., decryption key) to the third party such that the third party may be able to decrypt outputs from the artificial neural network. A request sent over network 103 comprising one or more input values may further comprise the second key. An example of this implementation is described further with respect to FIG. 7.

In Step 350, the artificial neural network may decrypt one or more layers in the artificial neural network. The one or more layers may be hidden layers, similar to hidden layers 220 in FIG. 2 and/or hidden layers 220A, 220B, and/or 220N in FIG. 5. Decrypting a given node may comprise decrypting one or more node parameters associated with the given node. Node parameters associated with the given node which may not be used for the one or more input values may remain encrypted. Additionally or alternatively, all parameters associated with a given node and/or nodes in a given layer may be decrypted.

For a given layer in the artificial neural network, one or more nodes in the given layer may be decrypted based on a second key and a second function. The second key may be stored in memory associated with the artificial neural network, such as on computing device 101 or on server 105 as depicted in FIG. 1. Additionally or alternatively, the second key may be received over network 103 as a request comprising the one or more input values. The second key and the second function may be the same as the first key and the first function, respectively. Additionally or alternatively, the second key may be a corresponding public key when the first key is a private key. Additionally or alternatively, the second key may correspond to a symmetric key shared by one or more parties to improve calculation speed.

The second function may be a function which has the effect of, with the second key, negating the impact of the first function with the first key. For example, if the first function was "multiply by [first key]" where first key equaled 5, the second function may be "divide by [second key]" where the second key equals 5. The first and second function may be identical.

In Step 360, node output values may be calculated on a given layer based on the one or more input values. The one or more input values may be node output values calculated by a previous layer in the artificial neural network, similar to the displayed in FIG. 2 or FIG. 5. Node output values from a given node in a given layer may be calculated using the one or more activation functions associated with the given node and based on the one or more node output values calculated by the previous layer and/or the one or more decrypted weights associated with the given node. Additionally or alternatively, the second key and the second function may be incorporated into one or more intermediary node calculations. The one or more node output values may be sent to a sequential layer in the artificial neural network.

In Step 370, the output layer of the artificial neural network may receive one or more intermediary input values and cause output of one or more final output values. The output layer may be similar to output layer 230 depicted in FIG. 2 and/or FIG. 5. The final output may be displayed on a user interface of a computing device, such as computing devices 107, 109, and/or monitor 120 corresponding to computing device 101. The final output may also be sent over network 103 to the requesting computing device, similar to those discussed with respect to step 350.

The final output values may not be encrypted based on the decryption of the artificial neural network during calculation. Additionally or alternatively, step 350 may be skipped and step 370 may further comprise decrypting the one or more final output values based on the second key and the second function. Delaying decryption to step 370 may reduce query time (e.g., time required for the artificial neural network to process the one or more inputs) by reducing a number of operations necessary for each layer. Additionally or alternatively, the final output values may be further processed in the output layer as appropriate for usage. For example, final output values may be normalized by applying a softmax transformation, which may be necessary to reduce a very wide range of possible output values to an actionable output value. Additionally or alternatively, normalizing transformations may be implemented as activation functions for last layer before the output layer.

FIG. 4 depicts a flowchart for adjusting one or more weights in the first plurality of nodes based on output of a loss function in accordance with one or more illustrative aspects. The first plurality of nodes may comprise one or more layers in an artificial neural network, similar to that depicted in FIG. 2. Adjusting one or more weights in the first plurality of nodes may be a step in training the artificial neural network, as described with respect to Steps 310 and 340 in FIG. 3. The example training method depicted in FIG. 4 and further described below may be similar to Stochastic Gradient Descent (SGD). Additionally or alternatively, one or more training methods or model types may be used, such as the training techniques described above with respect to step 310 in FIG. 3.

In Step 400, a computing device may calculate output of a loss function for each training parameter in a first plurality of training parameters. The computing device may be one or more of computing device 101, 105, 107, and/or 109 as depicted in FIG. 1. A training parameter, in the first plurality of training parameters, may comprise one or more training inputs and a corresponding training output. The training output may be an expected output for the artificial neural network and correspond to one or more training inputs. The first plurality of training parameters may be part of a set of training parameters, which may be portioned into one or more pluralities. Subsequent iterations of the training steps described in steps 400-450 in FIG. 4 may use a second plurality of training parameters from the larger set. A third plurality of training parameters may be reserved for testing one or more thresholds, as will be described in step 450. Training parameters may be collected from real world data and/or prepared for machine learning training.

A loss function may be a function that represents the difference between a training output and a final output produced by the artificial neural network based on the corresponding one or more training inputs. For example, in an image classification system that determines whether a picture has a dog or not, a training input may be a picture of a dog. For this training input, the corresponding output may be 1.0, representing 100% probability that the training input image is a picture of a dog. If the image classification system predicts, for the training input image of a dog, 0.75 likelihood that the image contains a dog, the output of the loss function for the training input image would be the difference between 0.75 and 1.0: −0.25. Additionally or alternatively, outputs of a loss function may be represented as absolute values.

In step 410, the computing device may identify one or more nodes associated with a largest absolute output of the loss function based on the first plurality of training parameters. The one or more nodes may be nodes used by the artificial neural network when processing a training parameter.

In step 420, the computing device may adjust one or more weights, wherein the one or more weights are associated with the nodes identified in step 410, such that the output of the loss function may be minimized. Adjusting one or more weights associated with a given node may adjust an intermediary output for an activation function associated with the given node, which may reduce the output of the loss function for the same training parameter. For example, an image classification system that predicted a 0.75 instead of 1.0 may, after one or more weights are adjusted, predict 0.85, which is closer to 1.0. Step 420 may immediately proceed to step 430. Additionally or alternatively, Steps 400-420 may be repeated one or more times before proceeding to step 430.

In step 430, the computing device may determine whether the artificial neural network satisfies a performance threshold. A performance threshold may be a method for measuring whether a model can satisfactorily process unknown and/or real-world data. Many performance thresholds and methods of selecting one or more performance thresholds, and a level at which the performance threshold is satisfied, are outside the scope of this disclosure.

As discussed with respect to step 330, performance thresholds may include, but are not limited to: mean absolute error (MAE), mean squared error (MSE), precision, recall, accuracy, speed, and/or more. A performance threshold may be selected based on, but not limited to: the type of model, type of inputs, type of expected outputs, size of model, and/or others. A level to satisfy the performance threshold may be selected based on use case needs, such as, but not limited to: consequences of a false positive and/or false negatives, prioritization of speed and/or accuracy, and/or more.

For example, performance thresholds selected for a classification model (e.g., a model which identifies whether an image contains a dog) may be precision, recall, and/or accuracy. Precision may indicate a number of true positives compared to a number of predicted positives, while recall may indicate a number of true positives compared to a number of correct positives. Accuracy may indicate a number of true positives and true negatives compared to a number of false positives and false negatives. An appropriate accuracy threshold level for a dog image classification model may be, for example, 0.75, indicating that the model correctly predicts whether an image contains a dog 75% of the time.

By contrast, performance thresholds selected for a regression model (e.g., a model which predicts a likelihood of rain based on other weather information on a scale of 0 to 1) may be MAE and/or MSE. Additionally or alternatively, some performance thresholds may apply to multiple types of models. For example, average speed of execution may be a performance threshold that applies to multiple types of models. A level to satisfy an average speed performance threshold may be adjusted based on use case: for example, a level for a neural network which outputs prose may be up to sixty seconds because the output is not time-sensitive and is computationally very intensive, while an appropriate level for other models may be only a few seconds or less.

A given type of model may be associated with one or more performance thresholds. For example, LLMs, which are a type of neural network and output prose, may also be appropriate to measure against performance thresholds including perplexity, burstiness, BERTscore, and/or others. Perplexity may refer to the probability that the LLM calculates for a next word within an output. Perplexity may be calculated based on a number of words in the training set and a number of words already in the output. A lower perplexity score may indicate, relative to the number of words in the training set, that the LLM may reliably predict a next word within an output. In implementation terms, an LLM with a lower perplexity score may output prose that is more natural, fluid, and/or may be incorporated into workflows more easily. However, perplexity does not measure whether output from the LLM is factually correct. Perplexity also does not measure the LLM's performance with respect to words outside of the training set.

Determining whether the artificial neural network satisfies a performance threshold may comprise one or more processes. For example, a second plurality of testing data may be analyzed by the artificial neural network and a loss function output calculated for each training point within the second plurality. The artificial neural network may be considered to satisfy a performance threshold when an average of loss function outputs across the second plurality is below a performance threshold. Additionally or alternatively, the artificial neural network may be considered to satisfy a performance threshold based on the artificial neural network satisfying a given performance threshold to a same degree as the artificial neural network satisfied the given performance threshold before encryption. One or more other performance thresholds may be used.

In step 440, the artificial neural network may be deployed for use with real-world and/or unknown data, for example, based on the artificial neural network satisfying a performance threshold. The artificial neural network may be hosted on a server, similar to server 105 in FIG. 1, and accessed over a network similar to network 103 in FIG. 1. The artificial neural network may begin receiving real-world and/or unknown inputs, similar to step 340 in FIG. 3.

In step 450, the artificial neural network may be retrained. For example, the artificial neural network may be retrained because the artificial neural network fails to satisfy a performance threshold. That is, steps 400-430 may be repeated for the artificial neural network until one or more performance thresholds are satisfied. The first plurality of training parameters may be used again; additionally or alternatively, a third plurality of training parameters may be selected and used. Additionally or alternatively, based on the artificial neural network failing to satisfy a first performance threshold but satisfying a second, the third plurality of training parameters may be selected to target improvements with respect to the first performance threshold.

The steps described in FIG. 4 may only be an example of one method for training an artificial neural network and additional, or fewer, steps may be used as appropriate.

Figure 5:
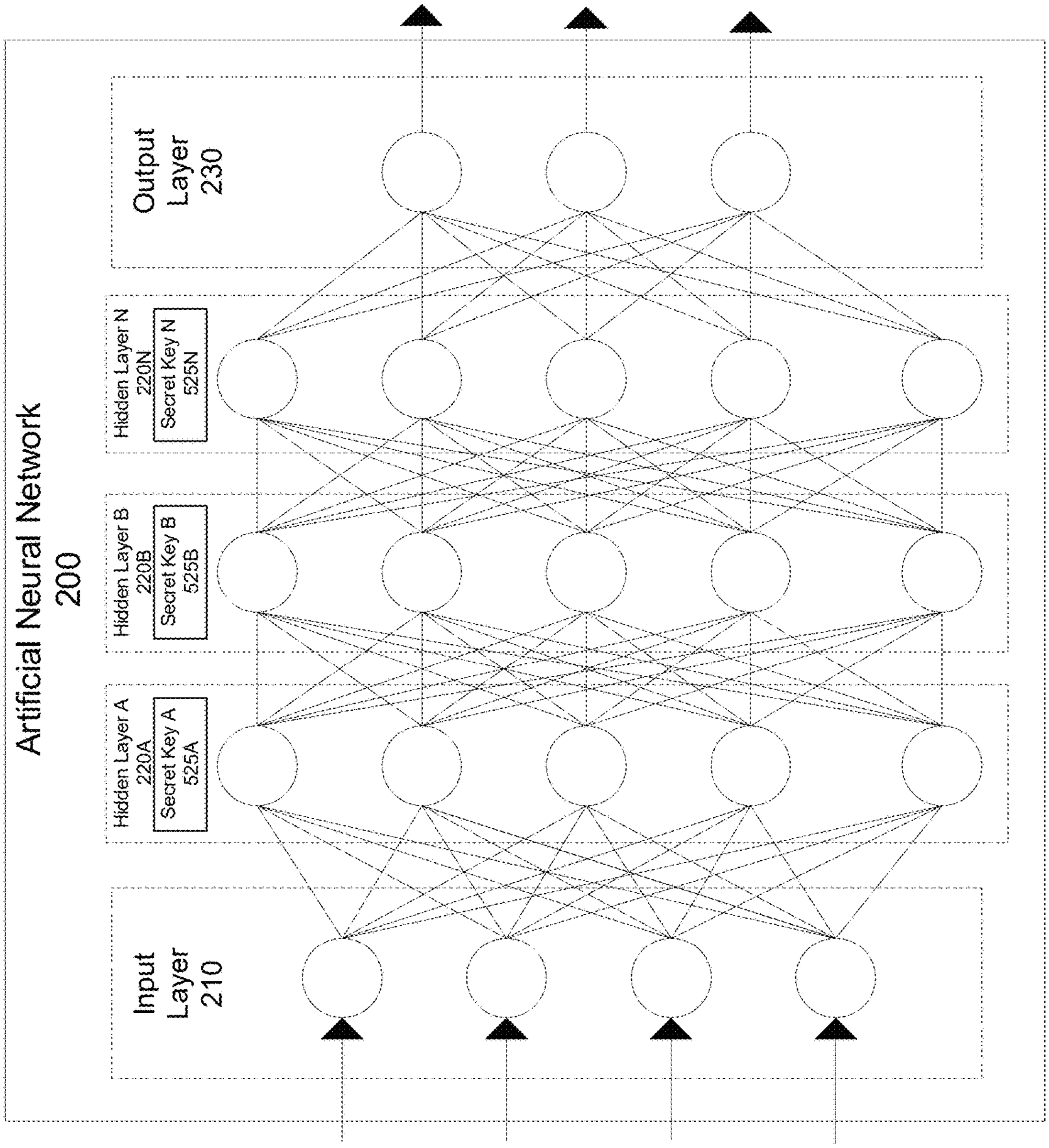
FIG. 5 depicts an example of a neural network architecture for a model with encrypted internal layers in accordance with one or more aspects of the disclosure.

FIG. 5 depicts an example of a neural network architecture for a model that has encrypted internal layers. The neural network architecture may be encrypted following a process similar to that described with respect to step 320 in FIG. 3 and may be trained with one or more training techniques as described with respect to step 310 in FIG. 3.

FIG. 5 depicts artificial neural network 200 with one or more encrypted hidden layers. Each hidden layer A 220A, B 220B, and/or N 220N may be encrypted with secret key A 525A, B 525B, and/or N 525N, respectively. Hidden layers 220A, 220B, and/or 220N may be encrypted through a process similar to that described with respect to step 320 in FIG. 3. Secret keys A 525A, B 525B, and/or N 525N may be identical or may be unique with respect to one or more other keys for the artificial neural network.

Artificial neural network 200 may receive one or more inputs to input layer 210. The one or more inputs may be received from a computing device, such as computing devices 101, 105, 107, and/or 109 in FIG. 1 and may be received via a network similar to network 103. The one or more inputs may be received as part of a request standardizing how inputs may be received for artificial neural network 200. Requests may be formatted and/or received/sent according to an API. Client requests will be described with further detail with respect to FIG. 7.

The one or more inputs may be sent from input layer 210 to hidden layer A 220A, similar to step 350 in FIG. 3. Hidden layer A 220A, which may be encrypted with secret key A 525A, may be decrypted before calculating one or more intermediary outputs from hidden layer 210A. Decrypting hidden layer A 220A may be similar to decryption techniques described with respect to step 350 in FIG. 3. In particular, decrypting hidden layer A 220A may comprise decrypting one or more weights and/or one or more activation functions based on a second function and a second key. The second key may be secret key A 525A. Additionally or alternatively, the second key may be calculated based on one or more of the following: secret key A 525A, a key received in the request, and/or a master key associated with artificial neural network 200.

After decryption, one or more intermediary inputs may be calculated at hidden layer A 220A and sent to hidden layer B 220B, similar to step 360 in FIG. 3. Hidden layer B 220B may further be decrypted and one or more intermediary inputs calculated and sent to a next sequential hidden layer, up through hidden layer N 220N. Hidden layer N 220N may send one or more intermediary outputs to output layer 230.

Output layer 230 may output one or more final outputs, which may be based on decrypted nodes in hidden layers 220A, 220B, and/or 220N. The one or more final outputs may be sent from artificial neural network 200 over network 103 to the requesting computing device 101, 105, 107, and/or 109. The one or more final outputs may be sent as part of an API response to computing device 101, 105, 107 and/or 109.

Figure 6:
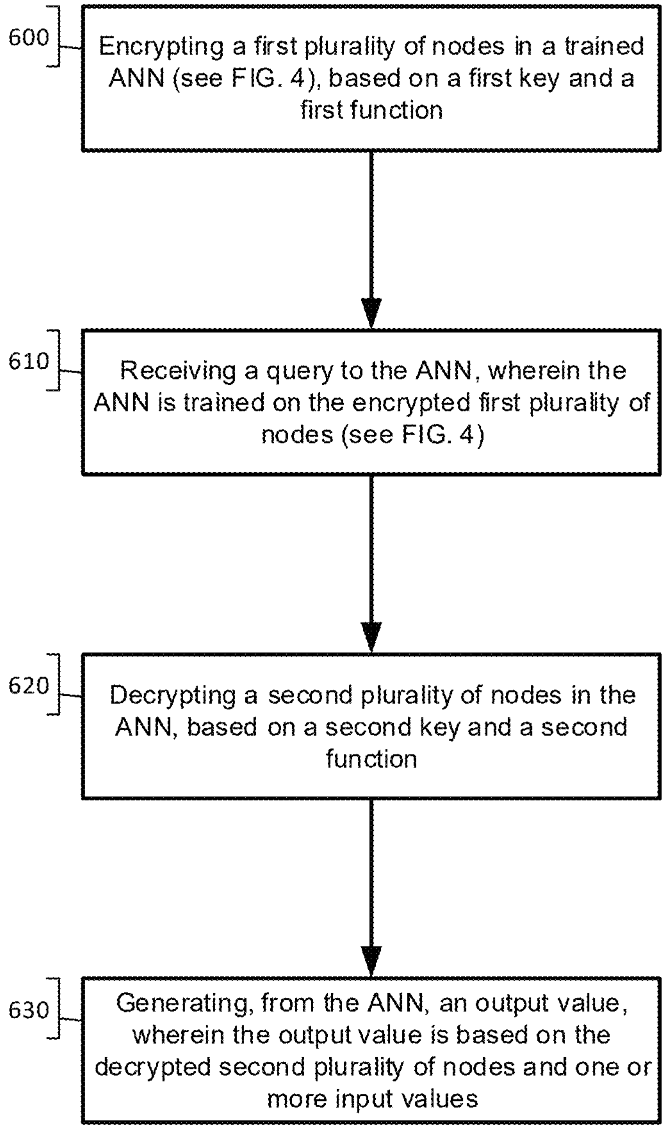
FIG. 6 depicts a flowchart for encrypting a pre-trained neural network according to one or more aspects of the disclosure.

FIG. 6 depicts a flowchart for encrypting a trained artificial neural network according to one or more aspects of the disclosure. FIG. 6 is an example of a workflow in which a first plurality of nodes in an artificial neural network may be encrypted with a first key and a first function. The artificial neural network may receive a query comprising one or more input values. A second plurality of nodes in the artificial neural network may be decrypted using a second key and a second function, and an output value generated by artificial neural network based on the decrypted second plurality of nodes and the one or more input values. The steps depicted in FIG. 6 are illustrative, and may be rearranged or omitted as desired. The steps in FIG. 6 may be performed by one or more computing devices, such as a computing device comprising one or more processors and memory storing instructions configured to perform one or more steps of FIG. 6. One or more non-transitory computer-readable media may store instructions that, when executed by one or more processors of a computing device, cause performance of one or more steps of FIG. 6.

In step 600, a computing device may encrypt a first plurality of nodes in a trained artificial neural network using a first key and a first function. The computing device may be similar to computing devices 101, 105, 107, and/or 109 as depicted in FIG. 1. Additionally or alternatively, the computing device may be one or more computing devices connected by a network. The artificial neural network may be similar to artificial neural network 200 in FIG. 2. Encrypting the first plurality of nodes based on the first key and the first function may be similar to step 320 in FIG. 3, wherein one or more weights associated with a node are encrypted based on the first key and the first function. The first plurality of nodes may not include every node in the artificial neural network. Encrypting less than every node in the artificial neural network may be preferable, for example, when not every node comprises confidential information. The first plurality of nodes may comprise one or more nodes in one or more layers in the artificial neural network.

In step 610, the computing device (e.g., the artificial neural network executing on a computing device) may receive a query comprising one or more input values. The artificial neural network may be hosted on a computing device similar to computing devices 101, 105, 107, and/or 109 as described with respect to FIG. 1. The artificial neural network may receive the query as a request over a network, similar to network 103 in FIG. 1. The query may be formatted and/or received/sent according to an API. Reception of a query will be described further with respect to FIG. 7. The query comprising one or more input values may be similar to the query described with respect to step 340 in FIG. 3. The query may comprise a natural language statement. Additionally or alternatively, one or more input values in the query may be determined by an API.

In step 620, a second plurality of nodes in the artificial neural network may be decrypted based on a second key and second function. The second plurality of nodes may be decrypted in steps similar to those described with respect to steps 350 and 360 in FIG. 3. The second plurality of nodes may comprise one, some, or all of the nodes in the first plurality of nodes. Additionally or alternatively, only nodes necessary to process the one or more input values may be in the second plurality of nodes (i.e., only decrypting nodes which may be used when processing the one or more inputs values). The second key and second function may neutralize the effect of the first key and the first function on output of an activation function associated with a given node in the second plurality of nodes. The second plurality of nodes may be decrypted on a layer-by-layer basis as the artificial neural network processes the one or more input values.

The second key may be received as an input value in the query received in step 610. Additionally or alternatively, an indicator for the second key may be received as an input value in the query. The indicator for the second key may be used to retrieve the second key. This aspect will be described further with respect to FIG. 7.

In step 630, the artificial neural network may generate an output value, wherein the output value is based on the decrypted second plurality of nodes and the one or more input values. The artificial neural network may process the one or more input values similarly to step 360 in FIG. 3, wherein intermediary output values may be determined by one or more decrypted nodes in a layer. The output value may be sent from the artificial network over a network, similar to network 103 in FIG. 1, to a computing device similar to computing devices 101, 105, 107, and/or 109. A system where the artificial neural network is hosted on a server and receives and sends requests to computing devices may be described further with respect to FIG. 7.

Figure 7:
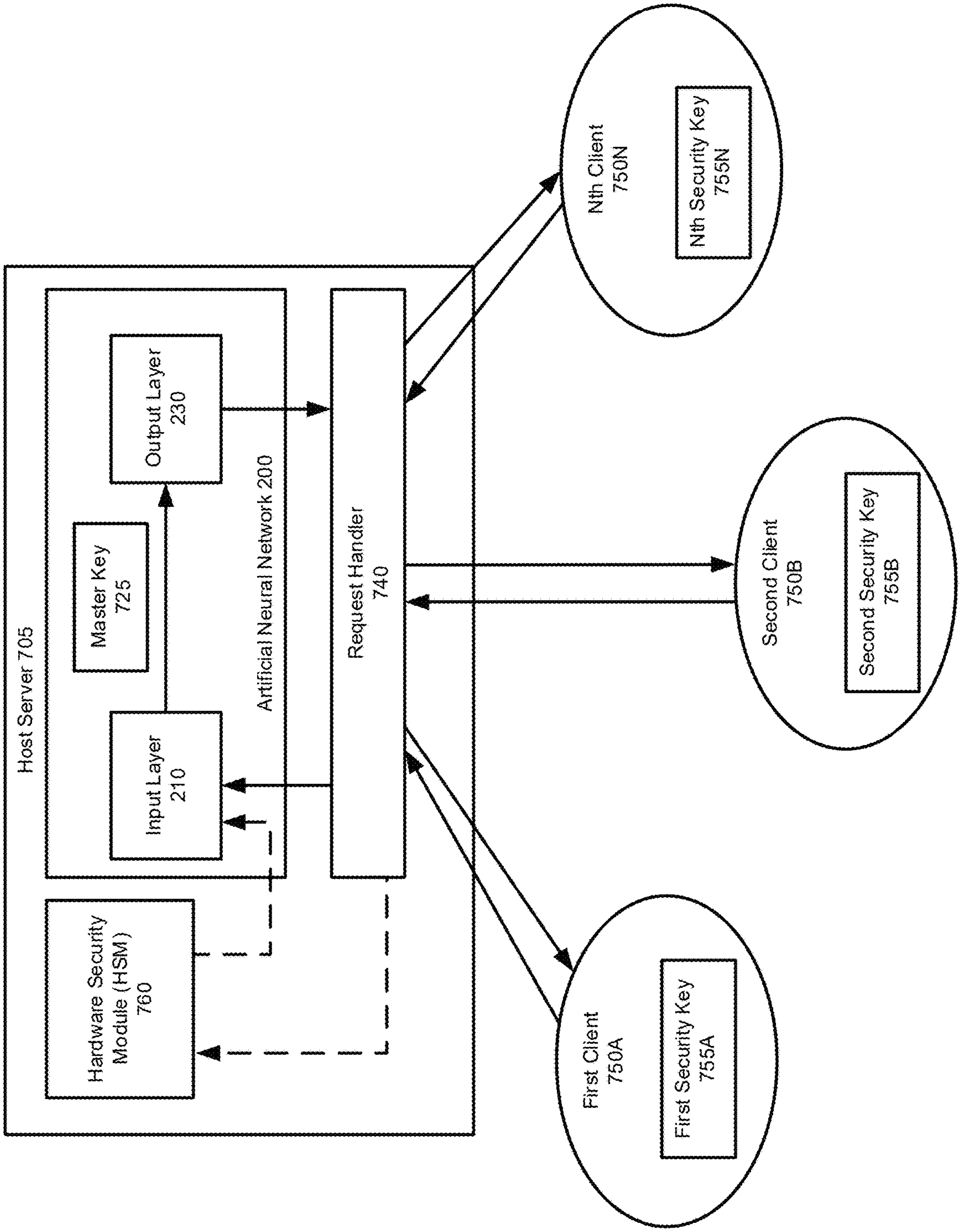
FIG. 7 depicts an example of an artificial neural network receiving requests from one or more third parties.

FIG. 7 depicts an example of an artificial neural network receiving requests from one or more third parties. According to some examples, the requests may comprise a public key authenticating the third party. A request from a third party may comprise one or more inputs and a key which authenticates the third party. Inputs to the artificial neural network from a third party may be processed similarly to the steps described in steps 340-370 in FIG. 3. Variations on the process in FIG. 3 may be possible to account for third party requests, as will be discussed below.

As shown in FIG. 7, artificial neural network 200 comprises an input layer 210, an output layer 230, and a master key 725. Although present, hidden layers 220 are not depicted in FIG. 7. As discussed in greater detail above, the hidden layers may be encrypted.

Artificial neural network 200 may have been encrypted according to step 320 in FIG. 3, based on a first key and a first function. The first key may be master key 720. The first function may be selected from homomorphic encryption schemes, such as BGV, BFV, CKKS, and/or others. Encrypted hidden layers in artificial neural network 200 may be similar to encrypted hidden layers 220A, 220B, and/or 220N in FIG. 5. Additionally or alternatively, similar to FIG. 5, one or more hidden layers in artificial neural network 200 may be encrypted with a given key unique to a given layer, such as secret key A 525A for hidden layer A 220A, secret key B 525B for hidden layer B 220B, and/or secret key N 525N for hidden layer N 220N in FIG. 5. A given key for a given hidden layer in artificial neural network 200 may be calculated based on master key 720. This configuration may allow for keys to be updated in the future while maintaining encryption and/or decryption capabilities over artificial neural network 200.

Artificial neural network 200 may be hosted on host server 705, similar to server 105 in FIG. 1. Additionally or alternatively, host server 705 may represent one or more distributed servers across which artificial neural network 200 may be stored, as was previously discussed with respect to FIG. 1 and FIG. 2.

Host server 705 may receive requests from first client 750A, second client 750B, and/or nth client 750N over network 103 to be submitted to artificial neural network 200. First client 750A, second client 750B, and/or nth client 750N may be authorized parties permitted to send inputs (e.g. queries and/or prompts) to artificial neural network 200. Authorized parties may be pre-authorized, i.e., parties whose identifies may be verified before sending a first request to artificial neural network 200. Additionally or alternatively, artificial neural network 200 may receive requests from the general public. In the example depicted by FIG. 7, first client 750A, second client 750B, and/or nth client 750N may be pre-authorized and may have, respectively, first security key 755A, second security key 755B, and nth security key 755N to verify identity of the requesting client. Additionally or alternatively, first security key 755A, second security key 755B, and/or nth security key 755N may be identifiers corresponding to a decryption key stored in hardware security module ("HSM") 760. HSM 760 may be similar to HSM 132 in FIG. 1. HSM 760 may be separate from clients and/or the artificial neural network 200 and may be used to store and maintain decryption keys for artificial neural network 200. For example, first security key 755A may be an indicator for a decryption key stored in HSM 760, where the decryption key may function as the second key described in FIG. 3. Using HSM 760 may ensure that decryption keys are stored securely and reduce risk associated with transmitting keys from first client 750A, second client 750B, and/or nth client 750N across the internet to request handler 740.

Requests may be received by request handler 740, which processes parameters within requests from clients, sends outputs for completed queries (e.g. prompts) back to a requesting client, and/or more. Request handler 740 may represent software serving as a front end for sending/receiving requests/responses for artificial neural network 200. Additionally or alternatively, request handler 740 may send a request to HSM 760 to retrieve a decryption key corresponding to a received security key. Request handler 740 may be integrated into input layer 210 of artificial neural network 200.

According to a first example, first client 750A may send a first request to host server 750. The following description may also apply to second client 750B and/or nth client 750N. The first request may be formatted according to an API. The first request may comprise one or more inputs to artificial neural network 200, one or more configuration nodes, a first security key 755A, and/or more. The one or more inputs may be similar to the one or more inputs discussed with respect step 340 in FIG. 3. The one or more configurations nodes may provide for adjustment of output and/or performance of artificial neural network 200 when processing the one or more inputs. For example, a first configuration node may configure artificial neural network 200 to prioritize speed over accuracy, while a second configuration node may configure artificial neural network 200 to prioritize fluency of a prose response over speed. Other configuration nodes may be possible.

First security key 755A may be a key provided by first client 750A verifying the first client 750A's identity. Additionally or alternatively, a client identifier may be provided in the first request. First client 750A may receive first security key 755A from an entity running host server 705 and artificial neural network 200 to ensure that requests from first client 750A may be verified as from first client 750A. Each client may have a unique security key; for example, first client 750A may include first security key 755A in requests to artificial neural network 200, second client 750B may include second security key 755B, nth client 750N may include nth security key 755N, and so forth.

First security key 755A, second security key 755B, and nth security key 755N may be calculated based on master key 725. Distributing security keys calculated based on master key 725 may allow for public keys to be able to decrypt artificial neural network 200 without compromising the security of master key 725. Additionally or alternatively, first security key 755A may be an indicator of a corresponding decryption key, where the corresponding decryption key is stored in HSM 760.

In the first request sent by first client 750A, first security key 755A may be a public key. Additionally or alternatively, first client 750A may have a private key from which first security key 755A is calculated. Public keys associated with a client may be generated based on a different key-exchange processes.

Request handler 740 may receive the first request from first client 750A. Request handler 740 may process one or more parameters in the first request, identify one or more inputs based on the first request, and forward the one or more inputs to artificial neural network 200. Additionally or alternatively, request handler 740 may also send a request to HSM 760 for a decryption key corresponding to first security key 755A. HSM 760 may send the corresponding decryption key to artificial neural network 200.

Artificial neural network 200 may receive the one or more inputs via input layer 210. Input layer 210 may be similar input layer 210 in FIG. 2 and/or input layer 210 in FIG. 5. Artificial neural network may 200 then process the one or more inputs through one or more hidden layers, which are not depicted in FIG. 6 but may be similar to hidden layers 220 in FIG. 2 and/or hidden layers A 220A, B 220B, N 520 N in FIG. 5. Output layer 230 may be a final layer in artificial neural network 200 and may output one or more final outputs.

Output layer 230 may send the one or more final outputs to request handler 740 to be formatted into a first response. The response may further comprise additional parameters, such as, but not limited to, a security key from host server 705 verifying identity of host server 705, one or more parameters to further configure artificial neural network 200 in a future query, and/or others. Request handler 740 may send the first response over network 103 to the requesting client, e.g. first client 750A.

Other implementations may also be possible. For example, it may be beneficial to retrain a model with respect to a specific target output; for example, an image generation model may be re-trained to improve quality of output images with respect to human hands. One or more of the methods described above with respect to FIG. 3-6 may be applied to one or more nodes and/or one or more layers added to the model to improve outputs with respect to the specific target output.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

We claim:

1. A computing device, comprising:

one or more processors; and memory storing instructions that, when executed by the one or more processors, cause the computing device to:

seed a first plurality of nodes in an artificial neural network comprising a plurality of layers each comprising one or more nodes, wherein a given node is associated with:

one or more weights, wherein the one or more weights are randomly generated, and one or more activation functions, wherein an activation function connects the node to a node in a sequential layer and is a formula to calculate an intermediary output value based on one or more input values and one or more weight;

encrypt, using a first key and a first function, one or more nodes in the first plurality of nodes, wherein the artificial neural network is trained based on the first plurality of nodes to predict an output for a type of input value and wherein encrypting a node comprises:

modifying one or more weights associated with the node such that an output value of an activation function associated with the node is further based on the first key and the first function;

receive one or more input values to the artificial neural network, wherein the artificial neural network is trained based on the encrypted nodes to predict an output for a type of input value;

at each layer in the artificial neural network:

decrypt, based on a second key and a second function, one or more nodes, wherein decrypting a node comprises modifying an activation function associated with the node to neutralize the encryption of the first key and the first function, determine, based on the one or more input values and one or more decrypted activation functions, one or more intermediary output values, and send the one or more intermediary output values to a sequential layer in the artificial neural network, wherein the one or more intermediary output values are received as one or more input values at the sequential layer; and cause output of, from the artificial neural network, an output value, wherein the output value is based on one or more decrypted nodes.

2. The computing device of claim 1, wherein the instructions further cause the computing device to:

seed a second plurality of nodes, wherein the second plurality of nodes is associated with confidential information;

encrypt, based on a third key and the first function, the second plurality of nodes, wherein the third key is calculated based on the first key and a cryptographic function;

embed the second plurality of nodes as one or more layers within the artificial neural network; and train the artificial neural network.

3. The computing device of claim 1, wherein:

the first key is a private key; and the second key is a public key calculated based on the first key.

4. The computing device of claim 3, wherein the second key is calculated using elliptic curve cryptography (ECC).

5. The computing device of claim 1, wherein encrypting the first plurality of nodes further comprises:

for one or more layers in the artificial neural network, calculating, based on the first key and a third function, a third key; and encrypting one or more nodes in the layer based on the first function and the third key.

6. The computing device of claim 5, wherein a layer is encrypted with a key that is unique within the artificial neural network.

7. The computing device of claim 1, wherein the first plurality of nodes comprises confidential information.

8. A computer-implemented method, comprising:

seeding a first plurality of nodes in an artificial neural network comprising a plurality of layers each comprising one or more nodes, wherein a node is associated with one or more weights and one or more activation functions;

encrypting, using a first key and a first function, one or more nodes in the first plurality of nodes, wherein the artificial neural network is trained based on the first plurality of nodes and wherein encrypting a node comprises:

modifying one or more weights associated with the node such that an output value of an activation function associated with the node is further based on the first key and the first function;

receiving one or more input values to the artificial neural network, wherein the artificial neural network is trained based on the encrypted nodes;

at each layer in the artificial neural network:

decrypting, based on a second key and a second function, one or more nodes, wherein decrypting a node comprises modifying one or more weights associated with the node to neutralize the encryption of the first key and the first function, determining, based on the one or more input values and one or more decrypted weights, one or more intermediary output values, and sending the one or more intermediary output values to a sequential layer in the artificial neural network, wherein the one or more intermediary output values are received as one or more input values at the sequential layer; and causing output of, from the artificial neural network, an output value, wherein the output value is based on one or more decrypted nodes.

9. The method of claim 8, further comprising:

seeding a second plurality of nodes, wherein the second plurality of nodes is associated with confidential information;

encrypting, based on a third key and the first function, the second plurality of nodes, wherein the third key is calculated based on the first key and a cryptographic function;

embedding the second plurality of nodes as one or more layers within the artificial neural network; and training the artificial neural network.

10. The method of claim 8, wherein:

the first key is a private key; and the second key is a public key calculated based on the first key.

11. The method of claim 10, wherein the second key is calculated using elliptic curve cryptography (ECC).

12. The method of claim 8, wherein encrypting the first plurality of nodes further comprises:

for one or more layers in the artificial neural network, calculating, based on the first key and a third function, a third key; and encrypting one or more nodes in the layer based on the first function and the third key.

13. The method of claim 12, wherein a layer is encrypted with a key that is unique within the artificial neural network.

14. The method of claim 8, wherein the first plurality of nodes comprises confidential information.

15. One or more non-transitory computer-readable media storing instructions that, when executed by one or more processors, cause a computing device to perform steps comprising:

seeding a first plurality of nodes in an artificial neural network, wherein the artificial neural network comprises a plurality of layers each comprising one or more nodes, and wherein a node is associated with an activation function and one or more weights;

encrypting, using a first key and a first function, one or more nodes in the first plurality of nodes, wherein the artificial neural network is trained based on the first plurality of nodes and wherein an output value of an encrypted node is further based on the first key and the first function;

receiving one or more input values to the artificial neural network, wherein the artificial neural network is trained based on the encrypted nodes;

at each layer in the artificial neural network and based on a second key and a second function, decrypting one or more nodes, wherein an effect of the first key and the first function on an output value of a decrypted node is neutralized; and causing output of, from the artificial neural network, an output value, wherein the output value is based on one or more decrypted nodes.

16. The one or more non-transitory computer-readable media of claim 15 storing instructions that, when executed by one or more processors, further cause a computing device to perform steps comprising:

seeding a second plurality of nodes, wherein the second plurality of nodes comprises confidential information;

encrypting, based on a third key and the first function, the second plurality of nodes, wherein the third key is calculated based on the first key and a cryptographic function;

embedding the second plurality of nodes as one or more layers within the artificial neural network; and wherein the artificial neural network is further trained based on the second plurality of nodes.

17. The one or more non-transitory computer-readable media of claim 15, wherein:

the first key is a private key; and the second key is a public key calculated based on the first key.

18. The one or more non-transitory computer-readable media of claim 17, wherein the second key is calculated using elliptic curve cryptography (ECC).

19. The one or more non-transitory computer-readable media of claim 15, wherein encrypting the first plurality of nodes further comprises:

for one or more layers in the artificial neural network, calculating, based on the first key and a third function, a third key; and encrypting one or more nodes in the layer based on the first function and the third key.

20. The one or more non-transitory computer-readable media of claim 19, wherein a layer is encrypted with a key that is unique within the artificial neural network.

* * * * *